US008830791B2

(12) United States Patent
Ueda

(10) Patent No.: US 8,830,791 B2
(45) Date of Patent: Sep. 9, 2014

(54) MEASUREMENT OF 3D COORDINATES OF TRANSMITTER

(75) Inventor: Tomoaki Ueda, Kyoto (JP)

(73) Assignee: Empire Technology Development LLC, Wilmington, DE (US)

( * ) Notice: Subject to any disclaimer, the term of this patent is extended or adjusted under 35 U.S.C. 154(b) by 462 days.

(21) Appl. No.: 13/256,670

(22) PCT Filed: Apr. 27, 2011

(86) PCT No.: PCT/US2011/034013
§ 371 (c)(1),
(2), (4) Date: Sep. 15, 2011

(87) PCT Pub. No.: WO2012/148390
PCT Pub. Date: Nov. 1, 2012

(65) Prior Publication Data
US 2012/0275270 A1    Nov. 1, 2012

(51) Int. Cl.
*G01S 15/00* (2006.01)
*G01S 5/22* (2006.01)
*G01S 15/60* (2006.01)

(52) U.S. Cl.
CPC ... *G01S 5/22* (2013.01); *G01S 15/60* (2013.01)
USPC .......................................................... 367/89

(58) Field of Classification Search
USPC .......................................................... 367/89
See application file for complete search history.

(56) References Cited

U.S. PATENT DOCUMENTS

| 5,128,961 A | 7/1992 | Ueda et al. |
| 5,139,020 A * | 8/1992 | Koestner et al. ................ 607/24 |
| 6,493,649 B1 * | 12/2002 | Jones et al. ................... 702/150 |
| 7,898,591 B2 | 3/2011 | Ueda |
| 2002/0196187 A1 | 12/2002 | Holt |
| 2003/0033148 A1 * | 2/2003 | Silverman et al. ............ 704/270 |
| 2008/0190206 A1 * | 8/2008 | Matsumoto et al. ............ 73/597 |
| 2008/0282872 A1 * | 11/2008 | Ma et al. ......................... 84/627 |
| 2009/0030471 A1 * | 1/2009 | Rousso et al. .................. 607/27 |
| 2009/0097681 A1 * | 4/2009 | Puria et al. .................... 381/318 |
| 2009/0224962 A1 * | 9/2009 | Pao et al. ...................... 342/179 |
| 2010/0007665 A1 * | 1/2010 | Smith et al. .................... 345/473 |
| 2010/0195445 A1 | 8/2010 | Calhoun |
| 2010/0278012 A1 * | 11/2010 | Tremper ....................... 367/102 |

FOREIGN PATENT DOCUMENTS

| JP | 2718222 | 2/1998 |
| JP | 2007-232737 | 9/2007 |
| JP | 4402161 | 1/2010 |

OTHER PUBLICATIONS

International Search Report mailed on Jul. 29, 2011.
A Robust Indoor Positioning and Auto-Localisation Algorithm, Rainer Mautz et al, Journal of Global Positioning Systems 2007, vol. 6, No. 1, pp. 38-46.
The Cricket Indoor Location System, Nissanka Bodhi Priyantha, Massachusetts Institute of Technology, Jun. 2005.
The Improvement of Ultrasonic Echo Resolution Applying a Method of Deconvolution, Tomoaki Ueda et al., IEICE Jan. 31, 1984.

* cited by examiner

*Primary Examiner* — Isam Alsomiri
*Assistant Examiner* — James Hulka
(74) *Attorney, Agent, or Firm* — Brundidge & Stanger, P.C.

(57) ABSTRACT

Implementations and techniques for measuring 3D coordinates of a transmitter using a receiver and a reflector are generally disclosed. The receiver may be attached asymmetrically to the reflector.

16 Claims, 17 Drawing Sheets

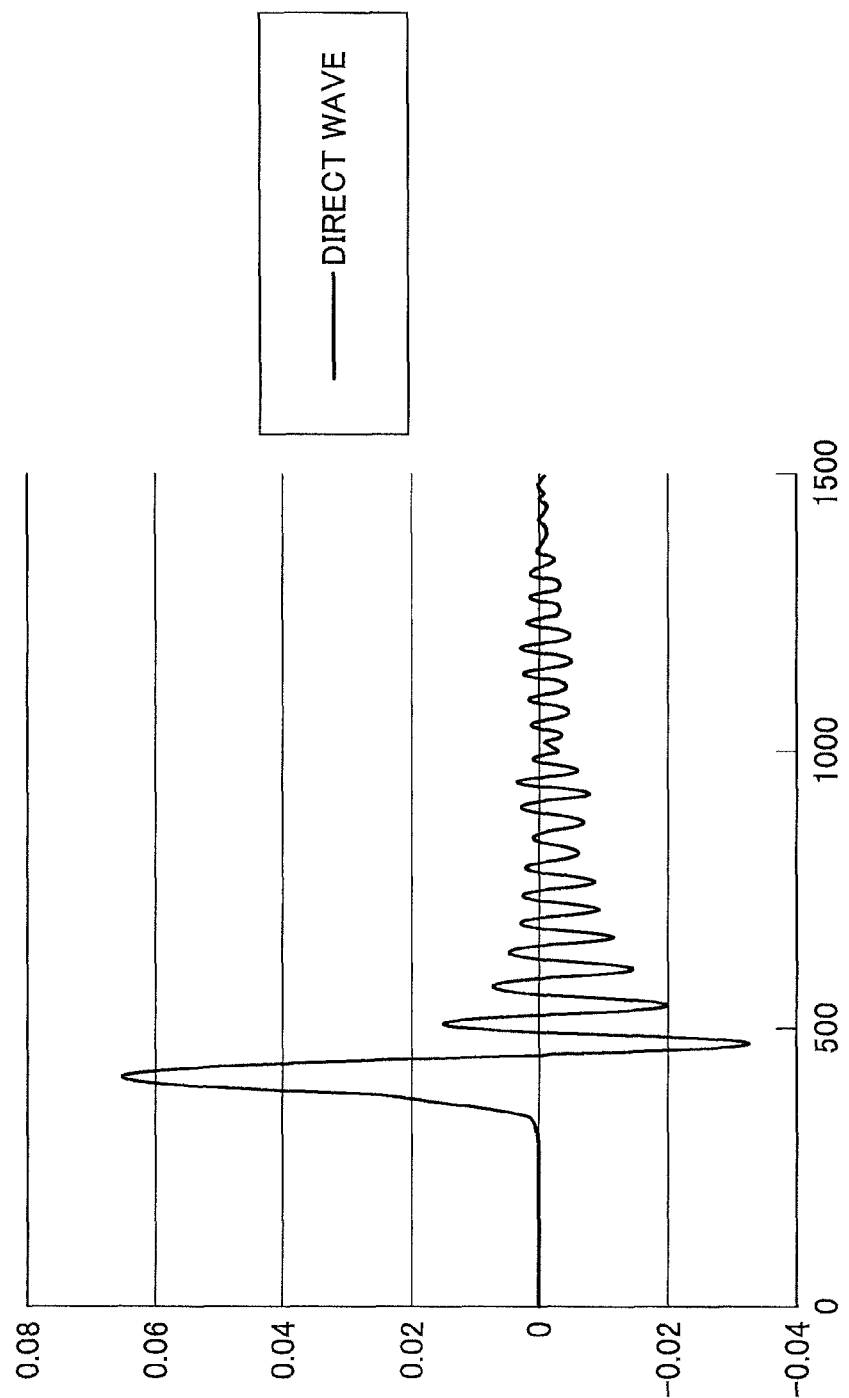

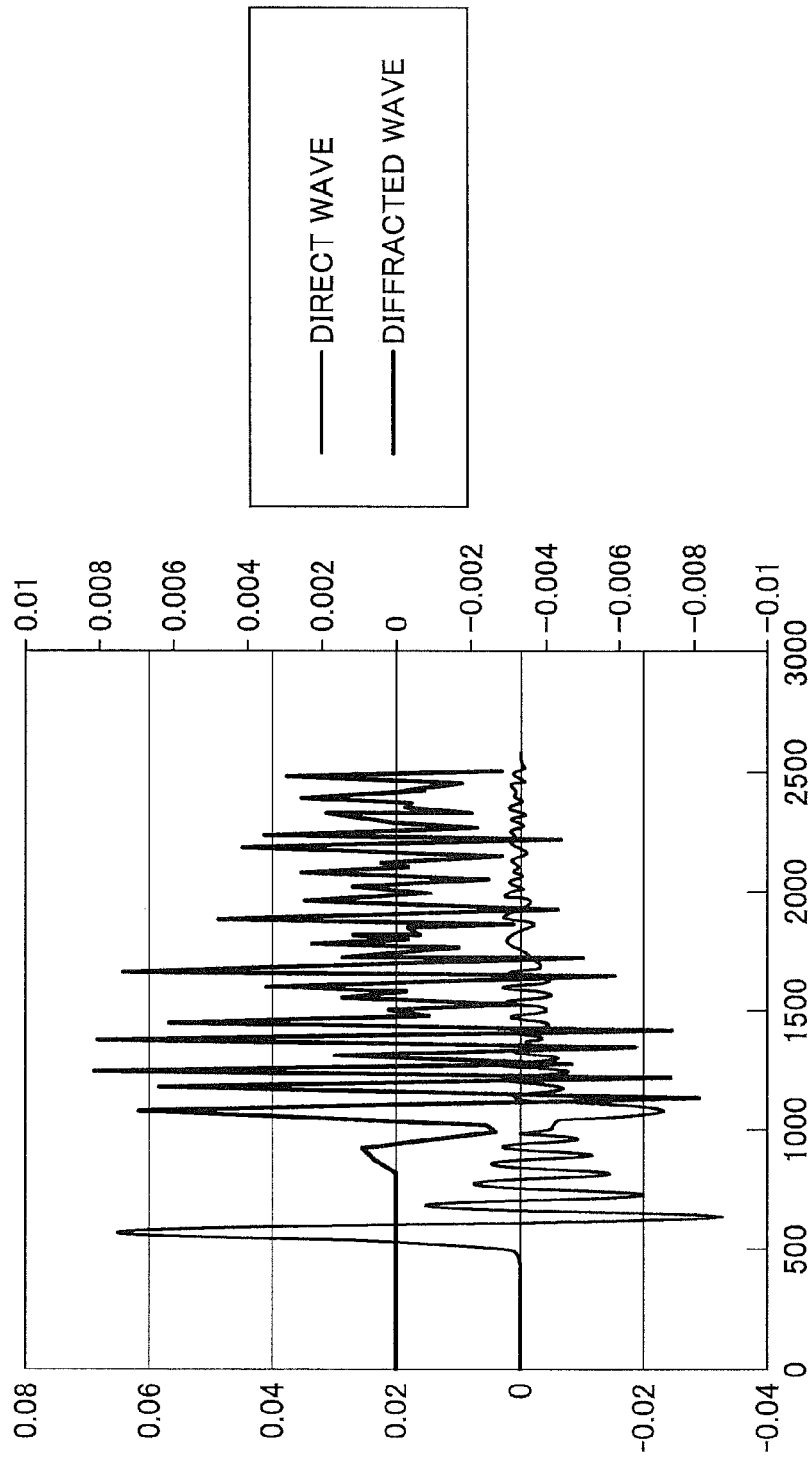

MEASUREMENT OF 3D COORDINATES OF TRANSMITTER

BACKGROUND

Unless otherwise indicated herein, the approaches described in this section are not prior art to the claims in this application and are not admitted to be prior art by inclusion in this section.

Measurement of 3D coordinates of a subject which transmits waves (i.e., transmitter) is useful in various applications.

Therefore, it is desired to provide useful ways of measuring 3D coordinates of a transmitter.

SUMMARY

In one example, an apparatus, which is configured to measure 3D coordinates of a transmitter which transmits a discontinuous wave, is generally described. In some examples, the apparatus may include one or more sets of a receiver and a reflector, the receiver being attached asymmetrically to the reflector and being configured to receive a direct wave from the transmitter and diffracted waves thereof, the diffracted waves being diffracted at edges of the reflector, and a processing device configured to process signals received by the one or more receivers.

In another example, an apparatus configured to measure 3D coordinates of a transmitter which transmits a discontinuous wave is generally described. In some examples, the apparatus may include one or more sets of a receiver and a reflector, the receiver being attached asymmetrically to the reflector and being configured to receive a direct wave from the transmitter and diffracted waves thereof, the diffracted waves being diffracted at edges of the reflector, and a processing device configured to process signals received by the one or more receivers.

In another example, a method for measuring 3D coordinates of a transmitter is generally described. In some examples, the method may include receiving with one or more sets of a receiver and a reflector a discontinuous wave transmitted by a transmitter, the receiver being attached asymmetrically to the reflector and being configured to receive a direct wave from the transmitter and diffracted waves thereof, the diffracted waves being diffracted at edges of the reflector. The method may include processing signals received by the one or more receivers to measure 3D coordinates of the transmitter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5A is a diagram illustrating an example of ultrasonic pulses emitted by a transmitter;

FIG. 5B is a diagram illustrating an example of received pulses affected by the diffracted pulses from the reflector;

Figure 1:
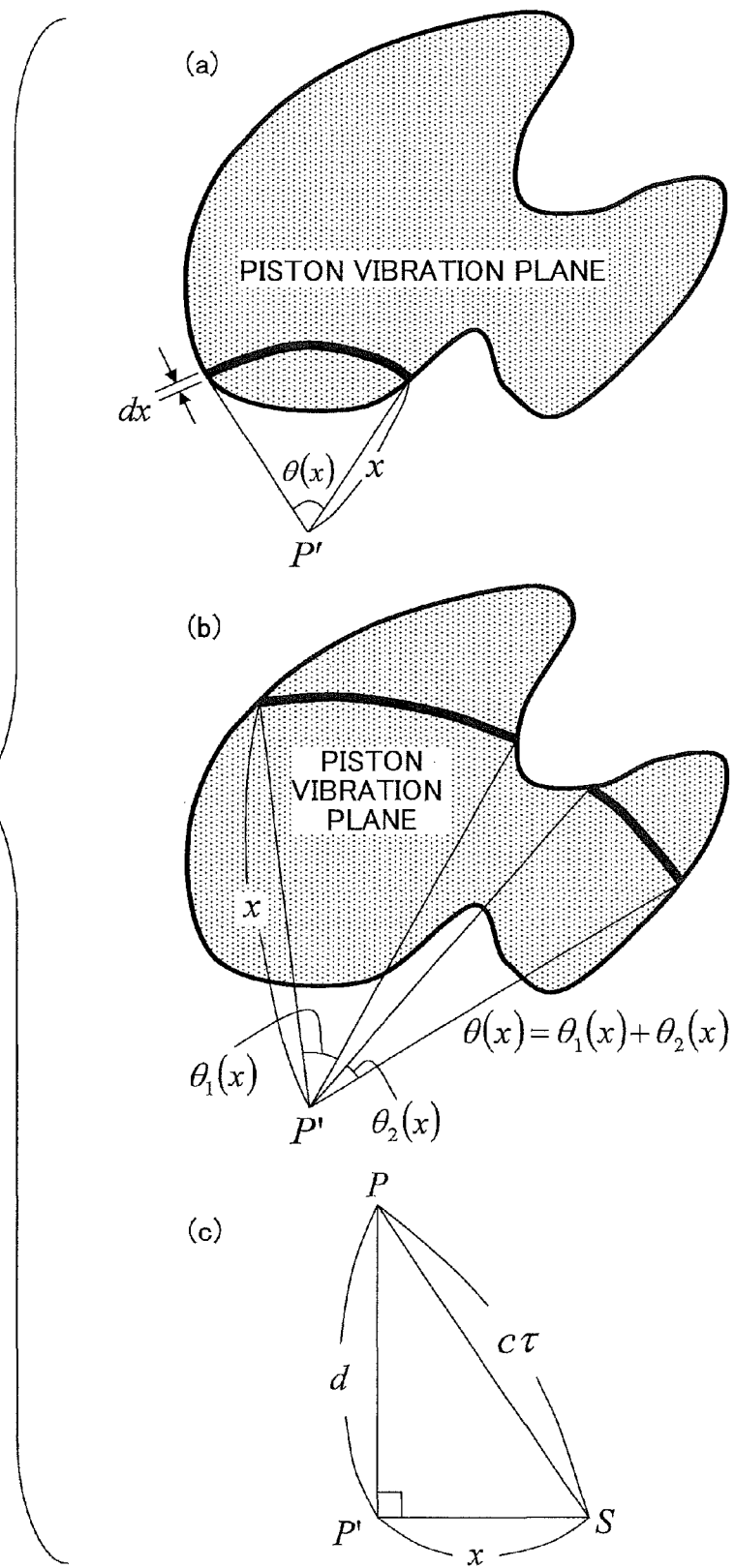
FIG. 1 is a diagram illustrating a definition of an angle of view.

all arranged in accordance with at least some embodiments described herein.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

At first, fundamental principles on which a part of the present disclosure is based are described.

An example of a calculation method for a velocity potential response is described. Here, an example of using FFT (fast Fourier transform) is described.

The velocity potential response satisfies the following equation:

$$y(t) = x(t) * \rho \frac{\partial \phi(t)}{\partial t} = \frac{\partial x(t)}{\partial t} * \rho \phi(t) \quad \text{(equation No. 1)}$$

where $\rho$ is the medium density and * denotes the convolution integral operator. $x(t)$ is the sound pressure of a direct wave (pulse) received with a microphone in an anechoic chamber in which the sound pulses are radiated by a sound marker. $y(t)$ is the sound pressure received with microphones with strip-shaped (ribbon-shaped) reflectors (see FIG. 4, for example).

The discrete Fourier transform (DFT) gives $x(t)$ from $y(t)$ and $\phi(t)$:

$$F[y(t)] = F\left[\frac{\partial x(t)}{\partial t}\right] \cdot F[\rho \phi(t)] \quad \text{(equation No. 2)}$$

where F[ ] denotes a DFT operation. Here, from the properties of convolution integral and DFT, the following equation holds:

$$F[\rho \phi(t)] = \frac{F[y(t)]}{F\left[\frac{\partial x(t)}{\partial t}\right]} \quad \text{(equation No. 3)}$$

Hence, $$\phi(t) = \frac{1}{\rho} F \left[\frac{F[y(t)]}{F\left[\frac{\partial x(t)}{\partial t}\right]}\right]^{-1} \quad \text{(equation No. 4)}$$

Figure 2:
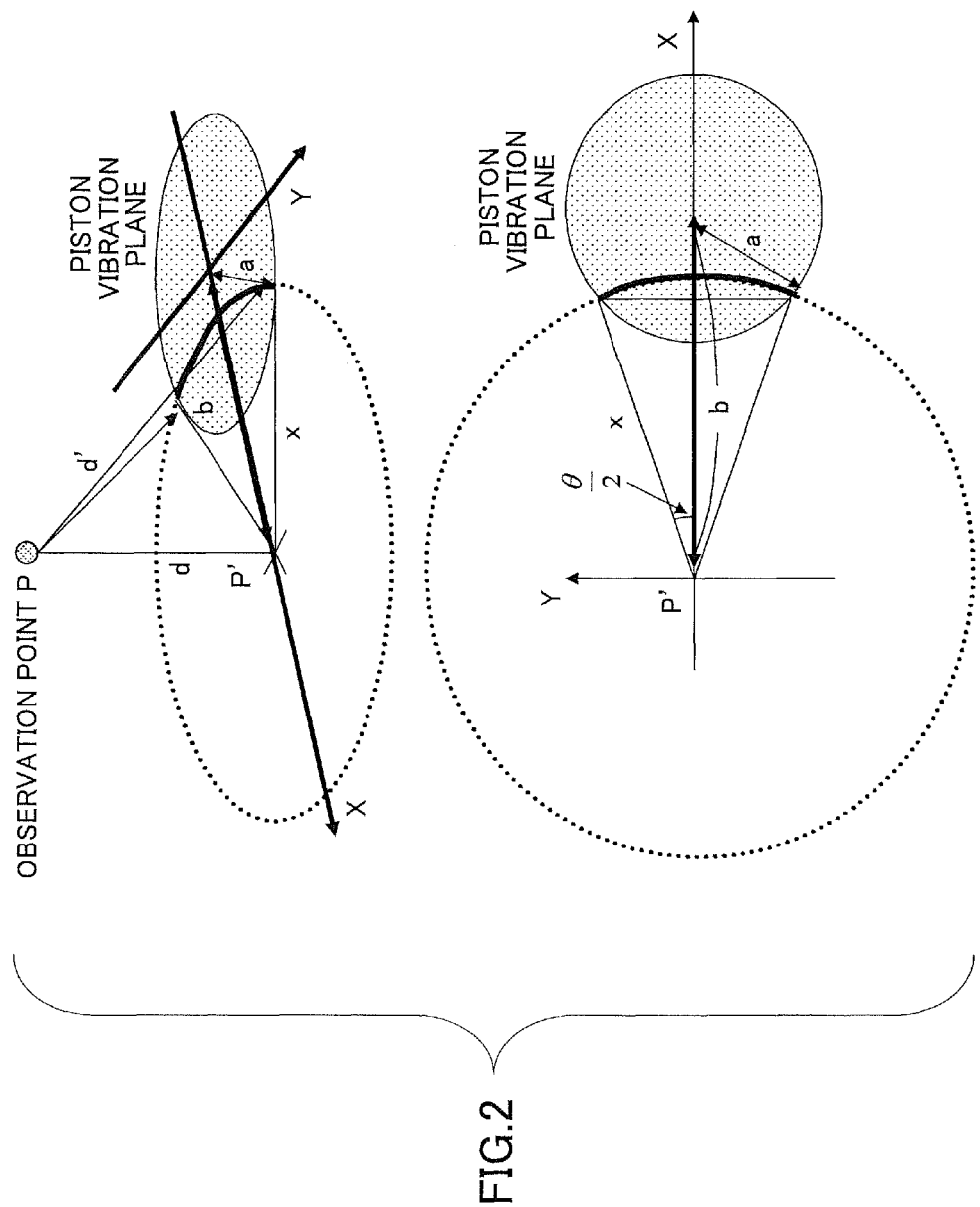
FIG. 2 is a diagram illustrating an angle of view used to obtain the velocity potential of sound that is radiated by a circular piston vibration surface in an infinite baffle plane.

Next, a relationship between an angle of view and the velocity potential response is described. As shown in FIG. 1, an angle of view $\theta$ represents the central angle of a sector that is defined by point P' and the extent of the set of sound sources or reflecting points, which are sources of sound at observation point P at time $\tau$. P' is the foot of the perpendicular line drawn from P to the sound source plane or the reflector plane. The velocity potential response is known to be proportional to the angle of view. For a direct wave, its sign remains unchanged; however, for a diffracted wave, its sign is inverted because the wave has been reflected off at the fixed end. As shown in FIG. 2, it is possible to obtain from the geometry the velocity potential response that is radiated by a circular piston vibration surface in an infinite baffle plane. In the case of FIG. 2, the angle of view $\theta$ is given by the following formula:

$$\theta = 2\cos^{-1}\left(\frac{b^2 + x^2 - a^2}{2bx}\right) \quad \text{(equation No. 5)}$$

This is known to be equivalent to the velocity potential response of a sound pulse radiated from a point source and captured by a microphone with a circular aperture.

The velocity potential response $\phi(t)$ for $t \geq d/c$ is given by the following formula:

$$\phi(t) = \frac{c}{2\pi} \theta\left(\sqrt{(ct)^2 - d^2}\right) \quad \text{(equation No. 6)}$$

Figure 3:
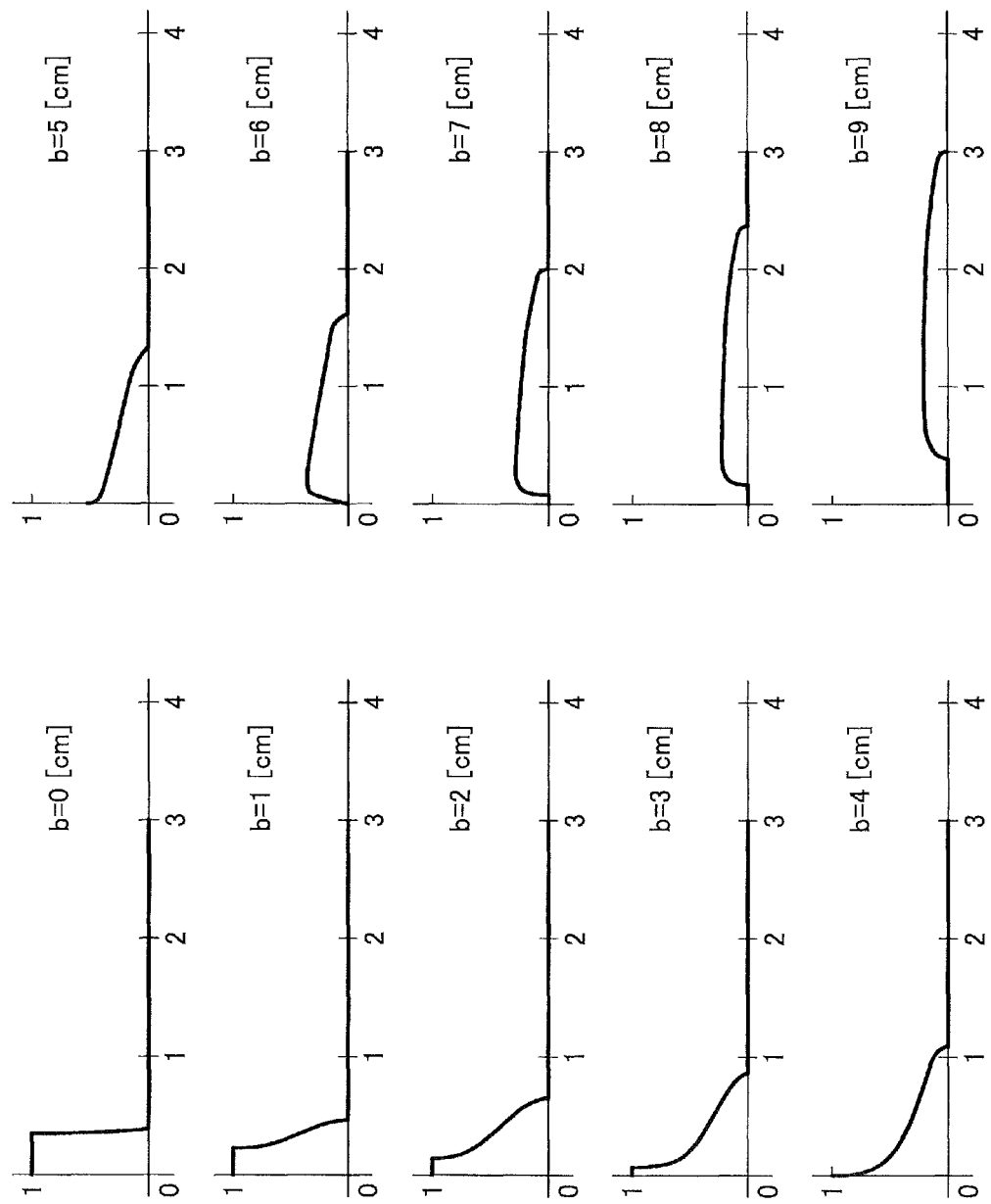
FIG. 3 is a diagram illustrating a calculation example of the velocity potential response $\phi(t)$ at distance d=50 cm produced by a circular piston of radius a=5 cm in an infinite baffle plane (Time axis: 20 μs/div.)

The velocity potential response $\phi(t)$ at distance d=50 cm produced by a circular piston of radius a=5 cm is depicted in FIG. 3. Analysis of the direct wave velocity potential reveals that the time width of velocity potential response includes directional information corresponding to the circular aperture.

Figure 4:
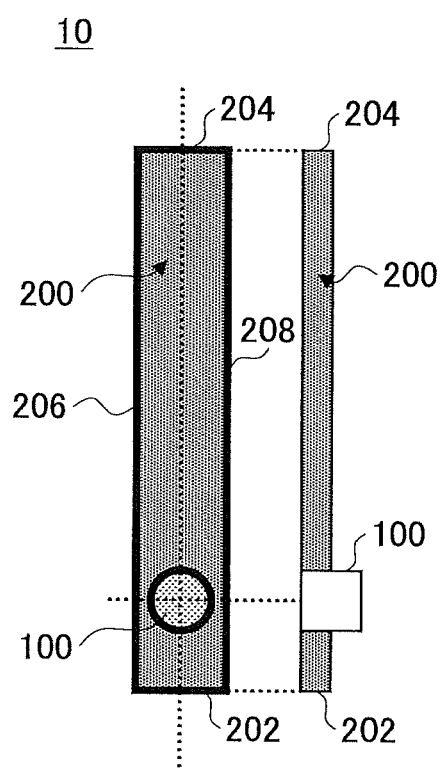
FIG. 4 is a diagram illustrating an example apparatus.

FIG. 4 is a diagram illustrating an example apparatus 10 arranged in accordance with at least some embodiments described herein. The apparatus 10 may be used to measure 3D coordinates of a transmitter as described hereinafter.

The transmitter may be configured to transmit a discontinuous wave. The discontinuous wave may be a short pulse wave. For example, the transmitter may transmit one or more ultrasonic pulses. The transmitter may transmit the discontinuous wave at regular intervals. The transmitter may be provided on any mobile object. The mobile object may include a robot, a human (a user), a device possessed by the user, etc. The device may be a portable device. For example, the device may be a display device which the user wears like eyeglasses.

The apparatus 10 may include a receiver 100 and a reflector 200.

The receiver 100 may include a microphone.

The microphone may be MEMS (Micro Electro Mechanical Systems) microphone or condenser microphone, as shown in FIG. 4. The microphone may detect not only a sound wave in the audio-frequency band (30 Hz to 20 kHz) but also a sound wave in the ultrasonic band (20 kHz or higher). The microphone may be asymmetrically attached to the reflector 200. The microphone may have an aperture with any shape. For example, the microphone may have a circular aperture as shown in FIG. 4. The microphone may be a unidirectional microphone.

The reflector 200 may be substantially flat. The reflector 200 may have an elongate shape. For example, the reflector 200 may have a substantially rectangular shape. In other words, the reflector 200 may be strip-shaped (ribbon-shaped) similar to the ears of many herbivorous animals. The reflector 200 may be an independent reflection plate which is configured to be attached to any product. Alternatively the reflector 200 may be a part of a casing or housing of any product. For example, the reflector 200 may a part of a casing or housing of a mobile phone or a laptop computer.

The receiver 100 may be provided at an asymmetrical location with respect to opposite edges of the reflector 200. For example, the receiver 100 may be provided at an asymmetrical location with respect to opposite short edges 202, 204 of the rectangular reflector 200, as shown in FIG. 4. In this case, the receiver 100 may be provided at a symmetrical location with respect to opposite long edges 206, 208 of the rectangular reflector 200, as shown in FIG. 4.

The reflector 200 may have a hole for receiving sound pressure at the asymmetrical position on the surface thereof. The receiver 100 may be provided in the hole formed in the reflector 200.

FIG. 5A is a diagram illustrating an example of ultrasonic pulses emitted by the transmitter. FIG. 5B is a diagram illustrating an example of received pulses affected by the diffracted pulses from the reflector. As shown in FIG. 5B, the received pulses may be affected by the diffracted pulses from the reflector 200. Specifically, the pulses emitted by the transmitter may be reflected off at the fixed end (i.e., the edge 202, 204, 206 or 208) of the reflector 200 and diffracted to become inverted sound pressure pulses. The receiver 100 may receive a mixture of direct and diffracted pulses, as shown in FIG. 5B.

Figure 6:
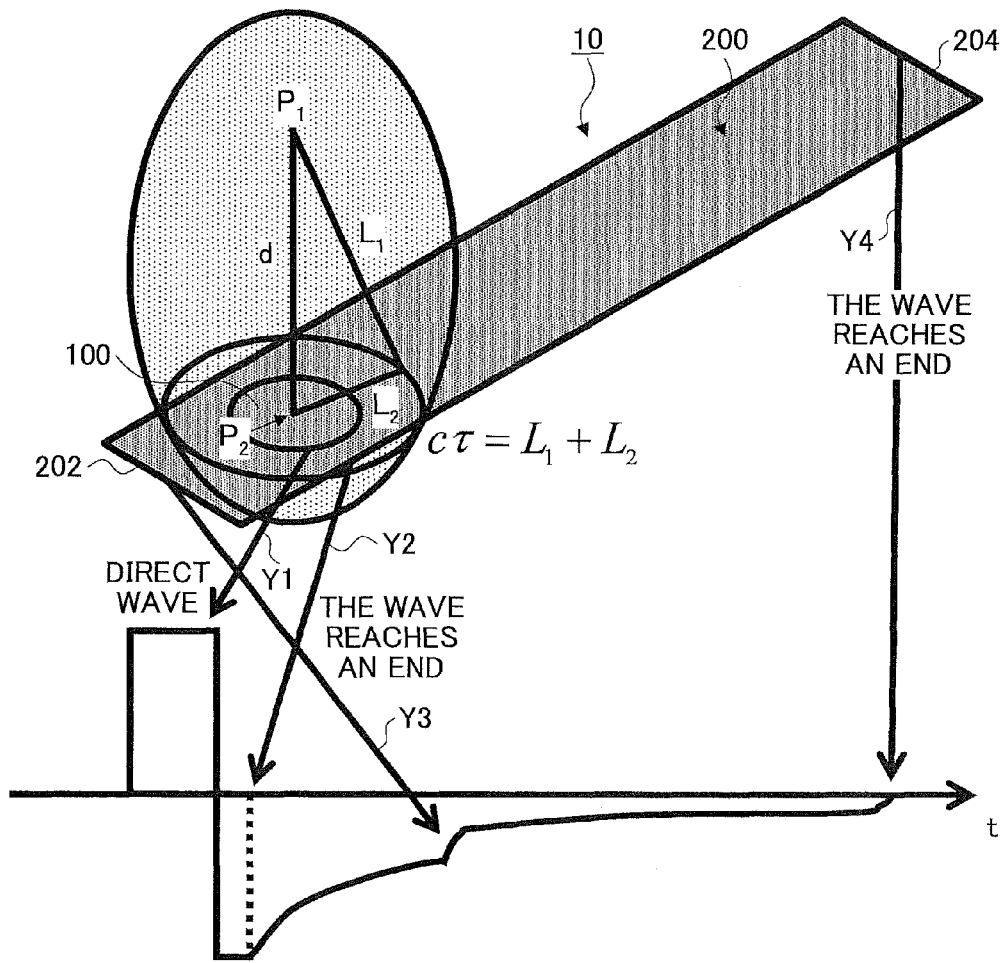
FIG. 6 is a diagram illustrating the velocity potential response for the apparatus shown in FIG. 4 when a sound source (i.e., a transmitter) is on the microphone aperture axis.

FIG. 6 is a diagram illustrating the velocity potential response for the apparatus 10 shown in FIG. 4 when a sound source (i.e., a transmitter) is on the microphone aperture axis.

In FIG. 6, it is assumed that a sound marker, which may be an example of a transmitter, is a relatively tiny sound source, and $P_1$ is its location.

It is also assumed that $P_2$ is the center location of the receiver 100 with an aperture of radius a. The receiver 100 receives two components: a direct wave and a diffracted wave that has a sign inverted by the fixed end reflection at the reflector. The calculation for the direct wave may be done in the manner mentioned earlier using its angle of view. For the diffracted waves, it is assumed that, for simplicity, the point $P_2$ of the receiver 100 (i.e., the center coordinates of the circular microphone) captures the wave radiated by the point sound source $P_1$.

In FIG. 6, a case is assumed where the point sound source $P_1$ is on the center axis of the receiver 100 (i.e., on the microphone aperture axis). In this case, as shown in FIG. 6, the sound wave that reaches the reflector 200 in propagation time T consistently forms one or more arc-shaped sets of crossover points between the ellipsoidal surface and the reflector 200. Hence, in FIG. 6 inflection points on the inversed velocity potential curve correspond one-to-one to the geometry of the reflector 200, as show by arrows Y2-Y4. For example, an infection point related to arrow Y3 is generated due to the diffracted wave at the left short edge 202 of the reflector 200(fixed end). Further, an infection point related to arrow Y4 is generated due to the diffracted wave at the right short edge 204 of the reflector 200(fixed end).

Figure 7:
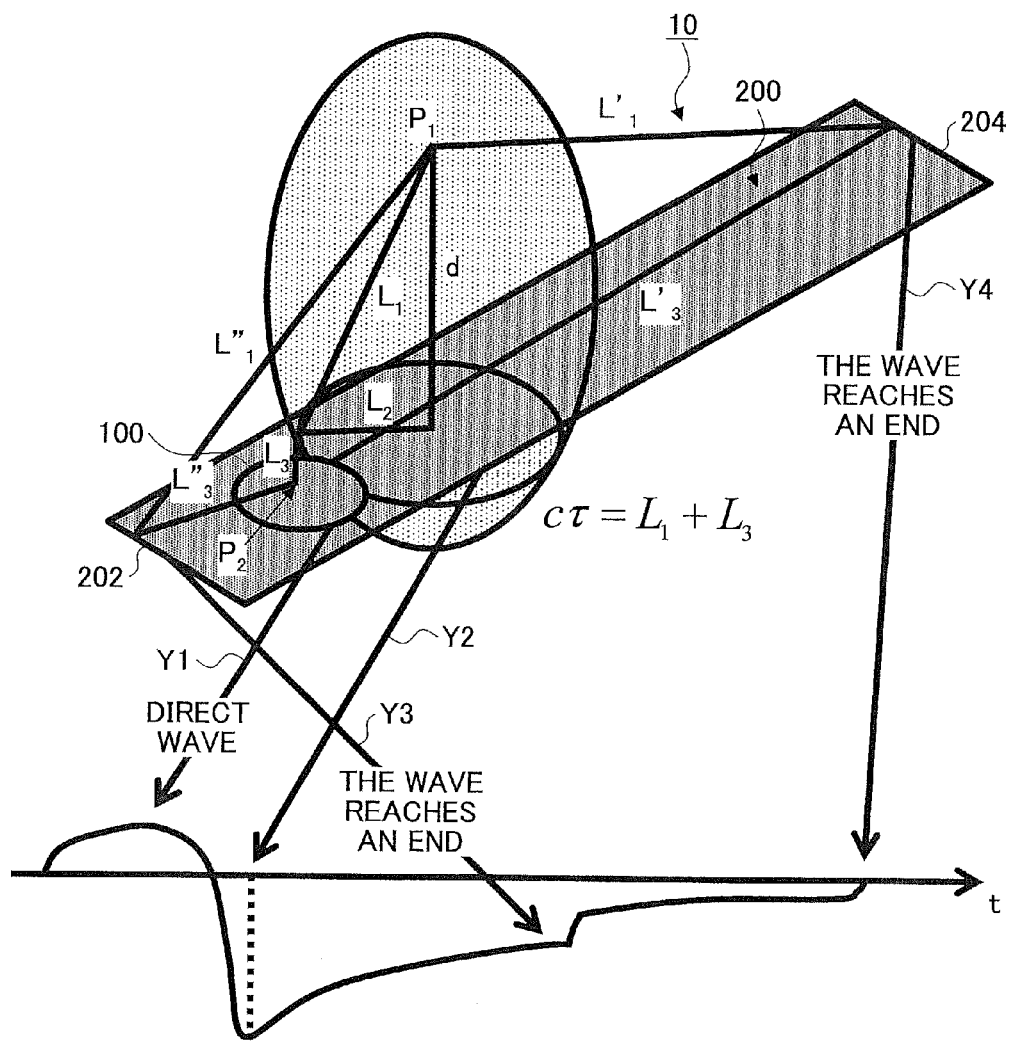
FIG. 7 is a diagram illustrating the velocity potential response for the apparatus shown in FIG. 4 when a sound source is not on the microphone aperture axis.

FIG. 7 is a diagram illustrating the velocity potential response for the apparatus 10 shown in FIG. 4 when a sound source is not on the microphone aperture axis.

In FIG. 7, the relative position of the sound source is changed with respect to that in FIG. 6. Specifically, FIG. 7 shows a case where a straight line drawn from a sound source and vertical to the surface of the reflector 200 has its foot on the surface of the reflector 200. The case shown in FIG. 7 has different inflection points from those in FIG. 6, because the propagation path difference is smaller compared with FIG. 6. In other words, inflection points include information on the relative position of the sound source with respect to the reflector 200. It is noted that, similarly, when a vertical line from a sound source to the surface of the reflector 200 has its foot outside the surface of the reflector 200, inflection points can be detected. Hence, by obtaining times of inflection points of the diffracted waves, the geometric location of the sound source can be uniquely identified.

The apparatus 10 may include a processing device 300. The processing device 300 may be configured to process a signal (see FIG. 5B, for example) received by the receiver 100.

Figure 8:
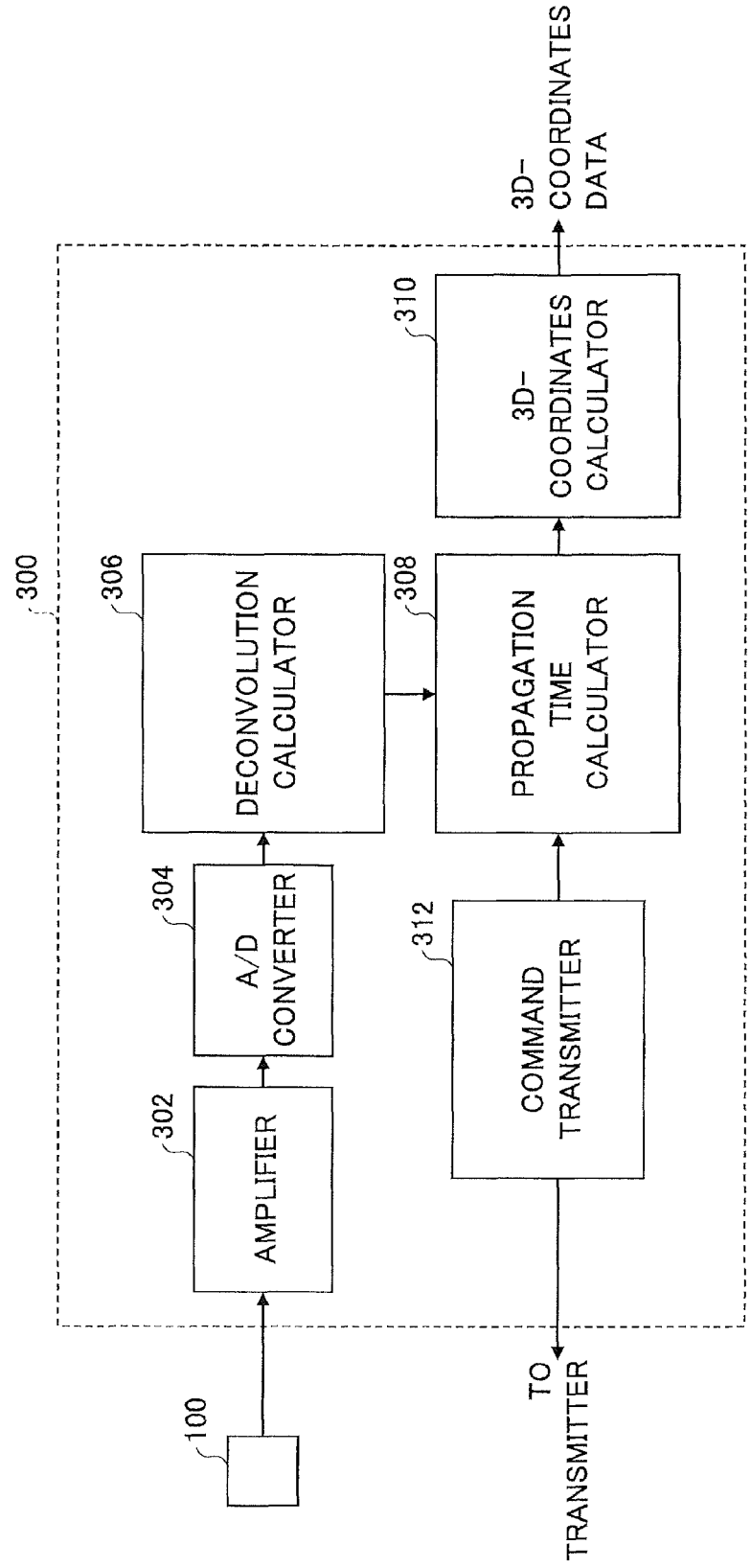
FIG. 8 is a diagram illustrating an example of components of a processing device.

FIG. 8 is a diagram illustrating an example of components of a processing device 300 arranged in accordance with at least some embodiment described herein.

The processing device 300 may include an amplifier 302, an A/D converter 304, a deconvolution calculator 306, a propagation time calculator 308 and a 3D-coordinates calculator 310. The processing device 300 may also include a command transmitter 312.

The amplifier 302 may be coupled to the receiver 100. The amplifier may be configured to amplify the signal received by the receiver 100. It is noted that if ultrasonic sound marker is used as the transmitter, a high-pass filter (HPF) or a band-pass filter (BPF) may be used to remove environmental noise and extract only the ultrasonic components.

The A/D converter 304 may be coupled to the amplifier 302. The A/D converter 304 may be configured to convert the amplified signal into a digital form.

The deconvolution calculator 306 may be coupled to the A/D converter 304. The deconvolution calculator 306 may be configured to deconvolute the digitized signal from the A/D converter 304 to calculate the velocity potential response. It is noted that the calculation for the velocity potential response may be done with FFT or a deconvolution calculation in the manner mentioned above based on the known information on the direct wave and the received signal. For example, FFT may be used to calculate the velocity potential response from the pre-registered direct pulse patterns and the received signal (i.e., the received diffraction pulse signal). The direct pulse patterns of the direct wave from a distant location may be derived based on a transfer function of the transmitter used or observed data.

Figure 9:
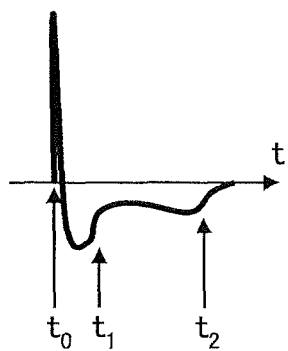
FIG. 9 is a diagram illustrating an example of the respective wave arrival times.

The propagation time calculator 308 may be coupled to the deconvolution calculator 306. The propagation time calculator 308 may be configured to detect (extract) times of the inflection points (i.e., diffracted wave arrival times) in the velocity potential response. The propagation time calculator 308 may also calculate time of the direct wave arrival. For example, the propagation time calculator 308 may calculate the direct wave arrival time $t_0$ and diffracted wave arrival times $t_1$ and $t_2$ based on the calculated velocity potential response, as shown in FIG. 9.

The 3D-coordinates calculator 310 may be coupled to the propagation time calculator 308. The 3D-coordinates calculator 310 may be configured to calculate 3D-coordinates of the transmitter (i.e., the sound source) based on the times of the inflection points. The way of calculating 3D-coordinates of the transmitter may be based on the principle described in connection with FIG. 6 and FIG. 7.

The command transmitter 312 may be coupled to the propagation time calculator 308. The command transmitter 312 may be configured to issue a command to the transmitter (not shown in FIG. 8) to transmit the discontinuous wave. The command transmitter 312 may issue the command to the transmitter irregularly or regularly (i.e., at predetermined time intervals). The command transmitter 312 may notify the propagation time calculator 308 of the issuance of the command.

Next, an example of a concrete way of calculating the 3D-coordinates of the transmitter (i.e., sound source) is described with reference to FIG. 9, FIG. 10, FIG. 11A, FIG. 11B and FIG. 12.

Figure 10:
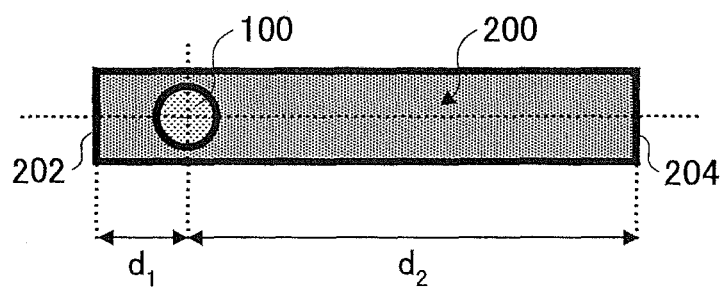
FIG. 10 is a diagram illustrating a definition of dimensions d1 and d2 of the reflector.

Here, dimensions $d_1$ and $d_2$ of the reflector 200 are defined as shown in FIG. 10. In FIG. 10, $d_1$ is a distance between the center of the circular aperture of the receiver 100 and one edge 202 (closer edge with respect to the receiver 100) of the reflector 200, and $d_2$ is a distance between the center of the circular aperture of the receiver 100 and another edge 204 (farther edge with respect to the receiver 100) of the reflector 200. The distance $d_2$ may be substantially longer than the distance $d_1$. Hereinafter, the side on which the edge 204 is located with respect to the receiver 100 may be referred to as "longer end-aperture distance side", and the side on which the edge 202 is located with respect to the receiver 100 may be referred to as "shorter end-aperture distance side".

Figure 11A:
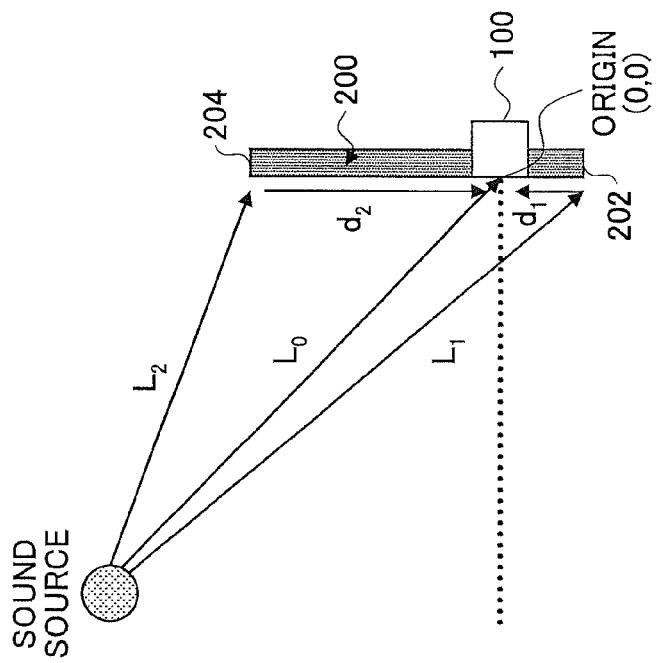
FIG. 11A is a diagram illustrating a case in which the sound source exists on the shorter end-aperture side.

FIG. 11A is a diagram illustrating a case in which the sound source exists on the shorter end-aperture side. In this case, the following relationships hold:

$L_0 = ct_0$ $L_1 = ct_1 - d_1$ $L_2 = ct_2 - d_2$ where c [m/s] is the speed of light. Further, as shown in FIG. 9, $t_0$ is the direct wave arrival time, $t_1$ is the first diffracted wave arrival time and $t_2$ is the second diffracted wave arrival time. It is noted that the first diffracted wave arrival time $t_1$ is related to the diffracted wave at the edge 202, and the second diffracted wave arrival time $t_2$ is related to the diffracted wave at the edge 204.

Figure 11B:
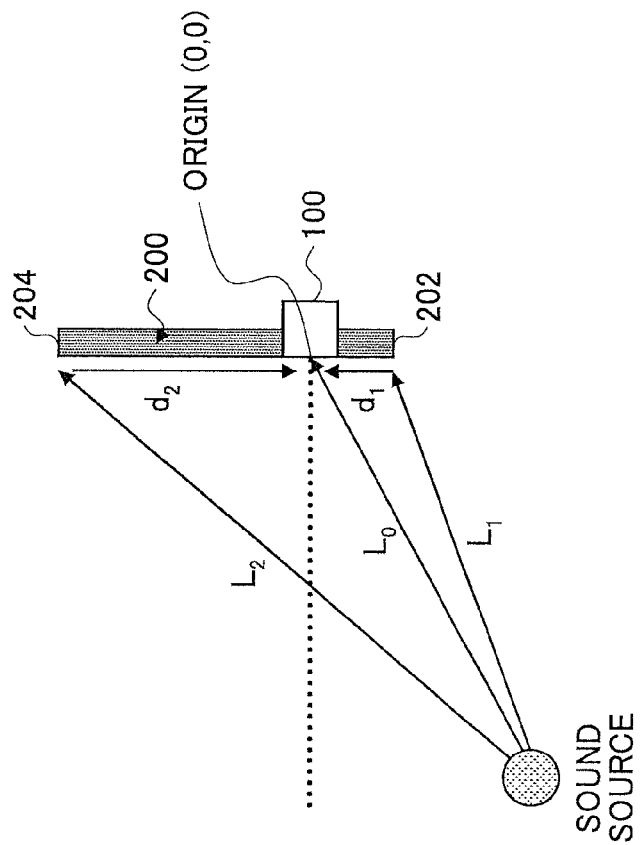
FIG. 11B is a diagram illustrating a case in which the sound source exists on the longer end-aperture side.

FIG. 11B is a diagram illustrating a case in which the sound source exists on the longer end-aperture side. In this case, the following relationships hold:

$L_0 = ct_0$ $L_1 = ct_2 - d_1$ $L_2 = ct_1 - d_2$

It is noted that the first diffracted wave arrival time $t_1$ is related to the diffracted wave at the edge 204, and the second diffracted wave arrival time $t_2$ is related to the diffracted wave at the edge 202.

In any case shown in FIG. 11A or FIG. 11B, the 3D-coordinates of the transmitter may be calculated using the following calculation principle.

Figure 12:
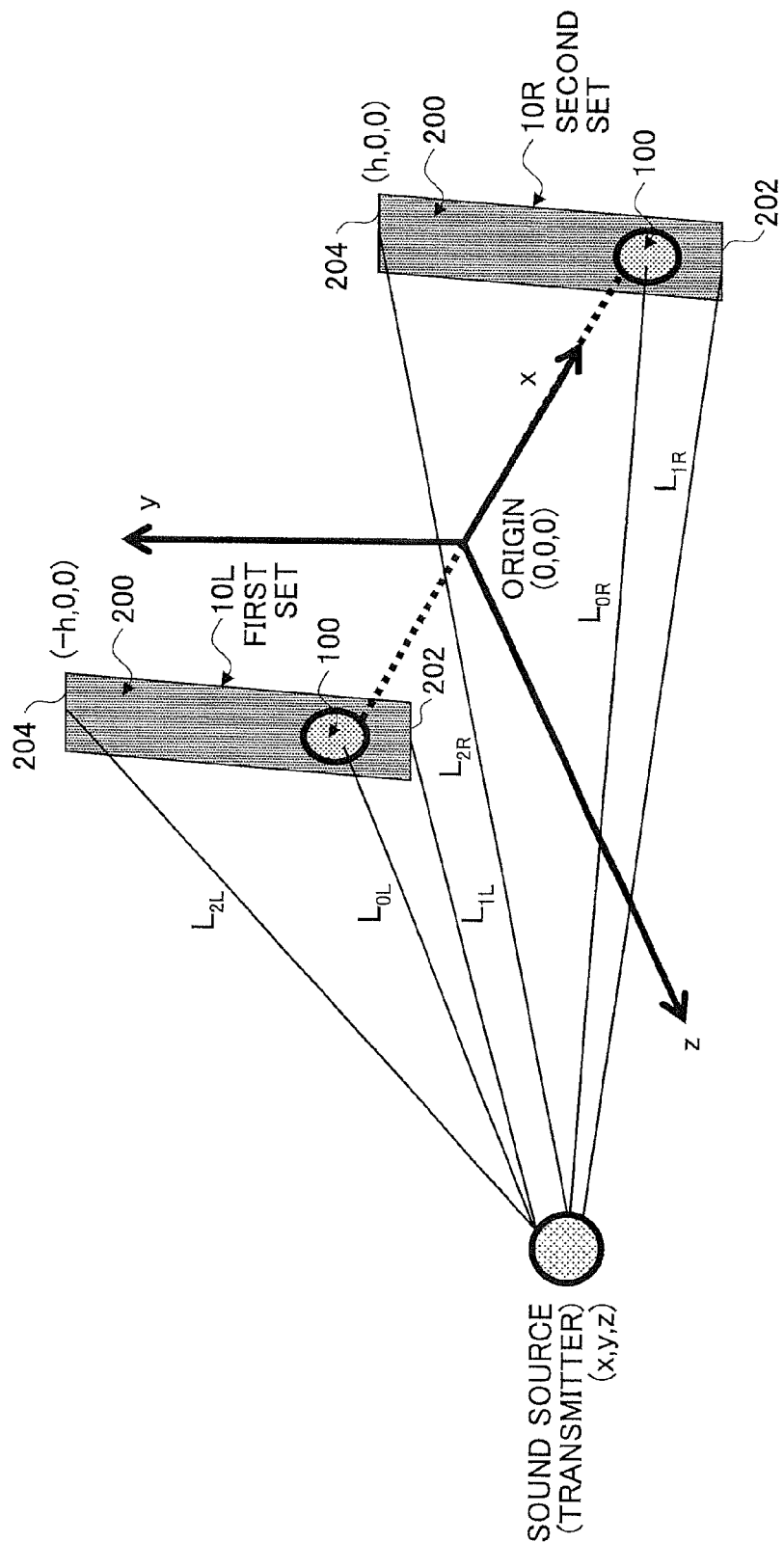
FIG. 12 is a diagram illustrating a relationship used to calculate the 3D-coordinates of the sound source.

Here, measurement with two channels is assumed, as shown in FIG. 12. Specifically, the apparatus 10 including two sets 10L, 10R of the receiver 100 and the reflector 200 may be used, as shown in FIG. 12.

The reflector 200 of the first set 10L and the reflector 200 of the second set 10R may have any orientation. For example, the reflector 200 of the first set 10L and the reflector 200 of the second set 10R may be arranged in parallel with respect to each other. The reflector 200 of the first set 10L and the reflector 200 of the second set 10R may be arranged in the same plane, as shown in FIG. 12.

Further, the reflector 200 of the first set 10L and the reflector 200 of the second set 10R may be positioned a specified distance apart. Theoretically, the specified distance may be any distance. The specified distance may depend on a size of a member (such as a casing of a master unit 500 shown in FIG. 14) on which the reflector 200 of the first set 10L and the reflector 200 of the second set 10R may be provided. The reflector 200 of the first set 10L and the reflector 200 of the second set 10R may be positioned in any direction.

Here, for simplicity, in FIG. 12, the coordinate system is assumed where the reflector 200 of the first set 10L and the reflector 200 of the second set 10R are in the x-y plane; the y axis is parallel with longitudinal (vertical) directions of the reflectors 200 of the first and second set 10L, 10R; the x axis is on the centers of the receivers 100 of the first and second set 10L, 10R; the origin is defined at the midpoint between the reflector 200 of the first set 10L and the reflector 200 of the second set 10R in a (horizontal) direction of the x axis; and the longer end-aperture distance sides are positive in the y axis.

The points $(-h, -d_1, 0)$ and $(h, -d_1, 0)$ correspond to the respective midpoints of the edges 202 of the reflectors 200 of the first and second sets 10L and 10R. The points $(-h, 0, 0)$ and $(h, 0, 0)$ correspond to the respective centers of the receivers 100 of the first and second sets 10L and 10R. The points $(-h, d_2, 0)$ and $(h, d_2, 0)$ correspond to the respective midpoints of the edges 204 of the reflectors 200 of the first and second sets 10L and 10R. As described with reference to FIG. 11A and FIG. 11B, the respective distances $L_{1R}/L_{0R}$, $L_{2R}$, $L_{0L}$ and $L_{2L}$ from the unknown coordinates of the sound source $(x,y,z)$ to the known respective coordinates $(-h, -d_1, 0)$ $(-h, 0, 0)$, $(-h, d_2, 0)$, $(h, -d_1, 0)$, $(h, 0, 0)$ and $(h, d_2, 0)$ can be expressed by the following six equations:

$(x+h)^2 + y^2 + z^2 = L_{0R}^2$ $(x+h)^2 + (y+d_1)^2 + z^2 = L_{1R}^2$ $(x+h)^2 + (y-d_2)^2 + z^2 = L_{2R}^2$ $(x-h)^2 + y^2 + z^2 = L_{0L}^2$ $(x-h)^2 + (y+d_1)^2 + z^2 = L_{1L}^2$ $(x-h)^2 + (y-d_2)^2 + z^2 = L_{2R}^2$ (equation No. 7)

It is noted that the distances $L_{1R}$, $L_{2R}$, $L_{1L}$ and $L_{2L}$ may be derived based on the assumption that the sound source exists on the longer end-aperture side or on the shorter end-aperture side. Three unknown variables x, y and z can be derived from these six equations. For example, the second and third equations in equation No. 7 give the unknown variable y as follows:

$$y = \frac{L_{1R}^2 - L_{2R}^2 - d_1^2 + d_2^2}{2(d_1 + d_2)}$$ (equation No. 8)

Further, the fifth and sixth equations in equation No. 7 also give the unknown variable y as follows:

$$y = \frac{L_{1L}^2 - L_{2L}^2 - d_1^2 + d_2^2}{2(d_1 + d_2)}$$ (equation No. 9)

It is noted that the values of y obtained by the equations No. 8 and No. 9 may be averaged to improve accuracy.

Further, the first and fourth equations in equation No. 7 also give the unknown variable x as follows:

$$x = \frac{L_{0R}^2 - L_{0L}^2}{4h}$$ (equation No. 10)

Finally, the unknown variable z can be derived by substituting the obtained variables y and x into one of the six equations (see equation No. 7).

It is noted that if the assumption that the sound source exists on the longer end-aperture side or on the shorter end-aperture side is erroneous, the values of z obtained from the six equations are different. Thus, it is possible to determine whether the sound source exists on the longer end-aperture side (see FIG. 11B) or on the shorter end-aperture side (see FIG. 11A). Further, if variance is calculated based on the six values of z obtained from the six equations, it is possible to determine whether the sound source exists on the longer end-aperture side or on the shorter end-aperture side.

It is noted that even if the direct wave arrival time $t_0$ and diffracted wave arrival times $t_1$ and $t_2$ cannot be derived because of the fact that no information on the timing of transmission of the discontinuous wave (the pulse wave, for example) from the transmitter is available, the 3D-coordinates of the sound source (x, y, z) can be derived from these six equations. In this case, the number of variables merely increases to four which is still less than the number of the equations (i.e., six).

According to the above-mentioned way of calculating the 3D-coordinates of the transmitter, two sets 10L, 10R of the receiver 100 and the reflector 200 are used; however, the number of the sets is arbitrary. For example, it is possible to use more than three sets so as to increase accuracy. Further, one set of the receiver 100 and the reflector 200 may be used, though additional information is required to identify the 3D-coordinates of the transmitter. The additional information may be obtained in any way. For example, a combination of the set of the receiver 100 and the reflector 200 and other measurement device may be used. Further, the additional information may be obtained by placing the receiver 100 asymmetrically with respect to the reflector 200 in two perpendicular directions. In this case, two channels measurement can be implemented by one set of the receiver 100 and the reflector 200. For example, in the example shown in FIG. 4, the receiver 100 may be provided at an asymmetrical location with respect to opposite short edges 202, 204 and with respect to opposite long edges 206, 208 of the rectangular reflector 200. In this case, the distances from the center of the receiver 100 to the respective edges 202, 204, 206, 208 may differ from each other. According to this arrangement, since total four inflection points can be obtained, total five equations instead of the six equations (see equation No. 7) may be obtained. Thus, three unknown variables x, y and z (i.e., the 3D-coordinates of the sound source) can be derived from these five equations.

Next, an example of a system in which the apparatus 10 may be used is described.

Figure 13:
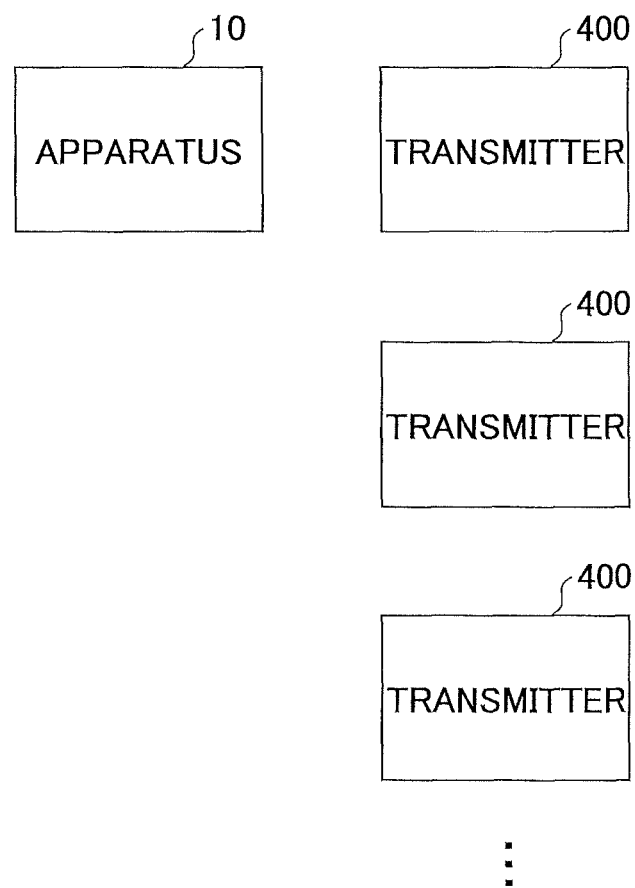
FIG. 13 is a diagram illustrating an embodiment of a system.

FIG. 13 is a diagram illustrating an embodiment of a system 20. The system 20 may include the apparatus 10 and one or more transmitters 400.

As described earlier, each transmitter 400 may be configured to transmit a discontinuous wave such as a pulse wave. For example, each transmitter 400 may transmit ultrasonic pulses. Each transmitter 400 may transmit the discontinuous wave at regular intervals. Each transmitter 400 may be provided on any mobile object. The mobile object may include a robot, a human (a user), a device possessed by the user, etc. For example, the device may be a display device which the user wears like eyeglasses.

Each transmitter 400 may be configured to transmit a discontinuous wave such as a pulse wave in response to a demand from the apparatus 10. Such a demand may be transmitted by the command transmitter 312 of the apparatus 10 (see FIG. 8). The demand may be transmitted by any devices other than the apparatus 10. The demand may be transmitted at regular intervals or when the 3D coordinates of each transmitter 400 become necessary. The demand may be transmitted in a time division manner to the respective transmitter 400.

The apparatus 10 may be configured to measure the 3D coordinates of one or more transmitters 400 as described earlier.

The system 20 may be used for various applications in which the 3D coordinates of one or more transmitters 400 measured by the apparatus 10 may used to implement any functions or effects.

Figure 14:
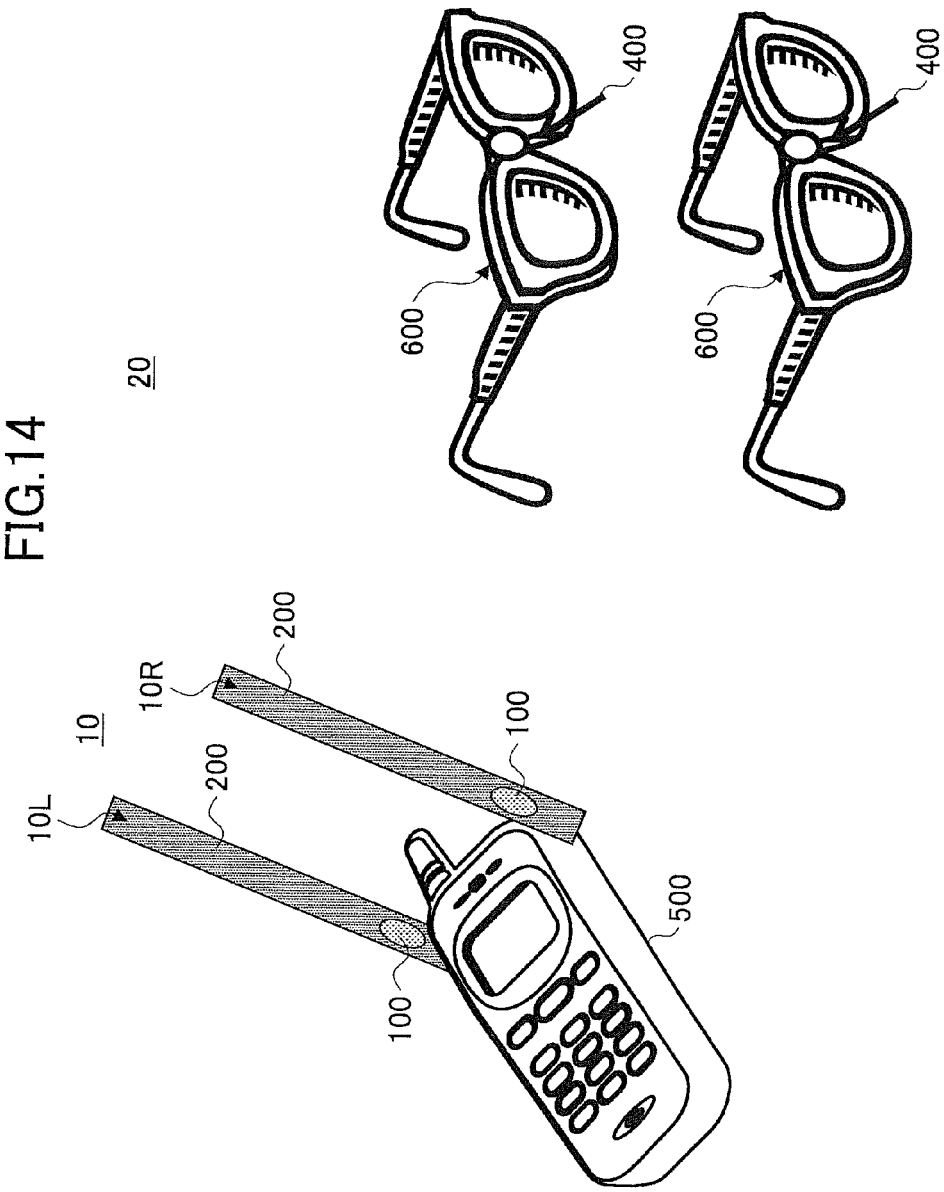
FIG. 14 is a diagram illustrating an example of an implementation of the system.

FIG. 14 is a diagram illustrating an example of an implementation of the system 20.

The system 20 may include a master unit 500 and display devices 600.

The master unit 500 may implement the apparatus 10. Specifically, the first set 10L of the receiver 100 and the reflector 200 may be attached to the left side of the casing of the master unit 500. The second set 10R of the receiver 100 and the reflector 200 may be attached to the right side of the casing of the master unit 500. The processing device 300 may be embedded in the master unit 500. The master unit 500 may use a digital HPF or a digital BPF. The master unit 500 may be implemented by an "Ubicomp" terminal configured to broadcast video/image contents.

It is noted that terminals with a sound input function, such as stereo sound input devices, usually accept stereo sounds. Many condenser microphones or MEMS microphones also detect ultra-sonic sound of up to 20 kHz to 60 kHz, because they are usually small and have high resonant frequencies. Thus, this 20 kHz or higher band may be utilized to carry out determining the 3D-coordinates of the sound sources (i.e., transmitters 400). In this case, a small physical modification such as adding reflectors 200 may be necessary.

The master unit 500 may be configured to provide each user individually with an image effect and/or a sound effect via the respective display devices 600 according to the 3D coordinates of the respective transmitters 400. These processes may be executed by the processing device 300 or other processing device in the master unit 500.

The display devices 600 may be coupled to the master unit 500 via wireless communication paths. The display device 600 may be in a form of goggles which the user can wear. The display device 600 may provide the user (who wears it) with an image effect and/or a sound effect. The display device 600 may include an ultrasonic marker as the transmitter 400. The display device 600 may be numbered according to the respective users.

Figure 15:
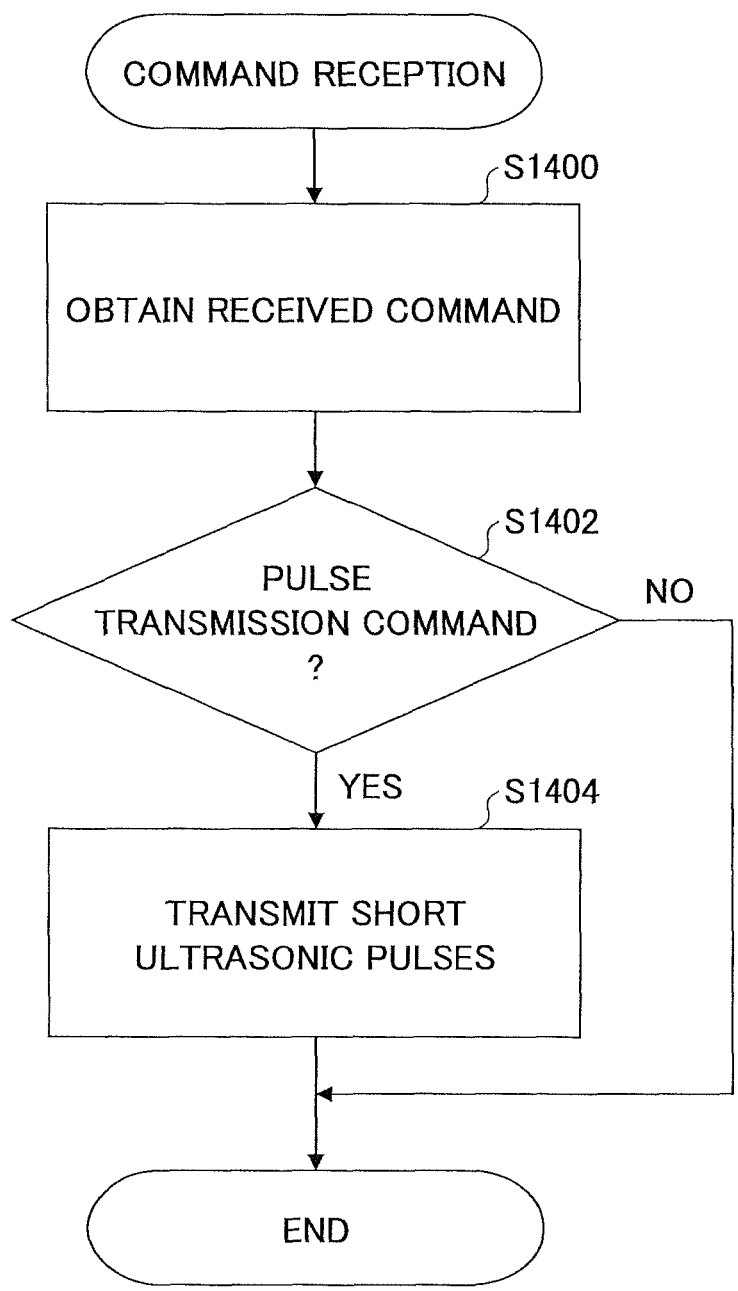
FIG. 15 is a flowchart illustrating an example of an operation of the ultrasonic marker.

In some embodiments, the transmitter 400 embodied as the ultrasonic marker may be configured to operate according to FIG. 15. Specifically, at the time of reception of the command, the transmitter 400 may obtain the received command (S1400). The command may be transmitted by the master unit 500. For example, the master unit 500 may instruct (i.e., issue commands) the numbered display device 600 of each user to transmit ultrasonic pulses regularly and sequentially. The master unit 500 may use a wired interface, an infrared interface or a wireless interface (ZigBee or Bluetooth, for example) to issue commands. Then, the transmitter 400 may determine whether the obtained command is a pulse transmission command (S1402). If the obtained command is a pulse transmission command, the transmitter 400 may transmit short ultrasonic pulses (S1404). Then, the transmitter 400 may return to a standby status for the reception of the next command.

Figure 16:
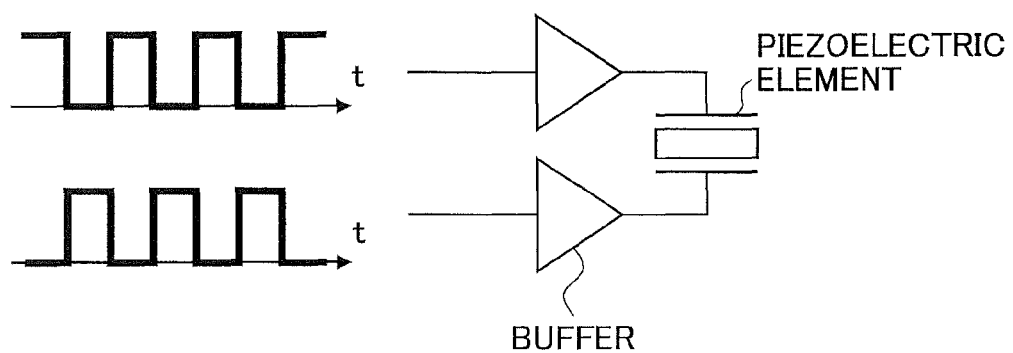
FIG. 16 is a diagram illustrating an example of a basic configuration of the ultrasonic marker.
Figure 17:
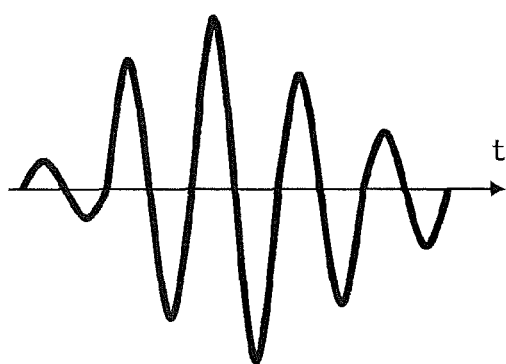
FIG. 17 is a diagram illustrating an example of short ultrasonic pulses.

The transmitter 400 embodied as the ultrasonic marker may include buffers and a piezoelectric element, as shown in FIG. 16. The short ultrasonic pulses may be emitted by digitally driving the piezoelectric element, as shown in FIG. 16. The short ultrasonic pulses may be as shown in FIG. 17. In this example, two and half driving pulses are used for one emission of the ultrasonic pulses; however, the width of the emitted pulses may be greater due to a transfer function property of the ultrasonic marker. It is noted that the piezoelectric element can be driven with a voltage of about 3.3 V, for example. Since a load of the piezoelectric element is capacitive in principle and is driven intermittently, it consumes a small amount of battery energy.

Figure 18:
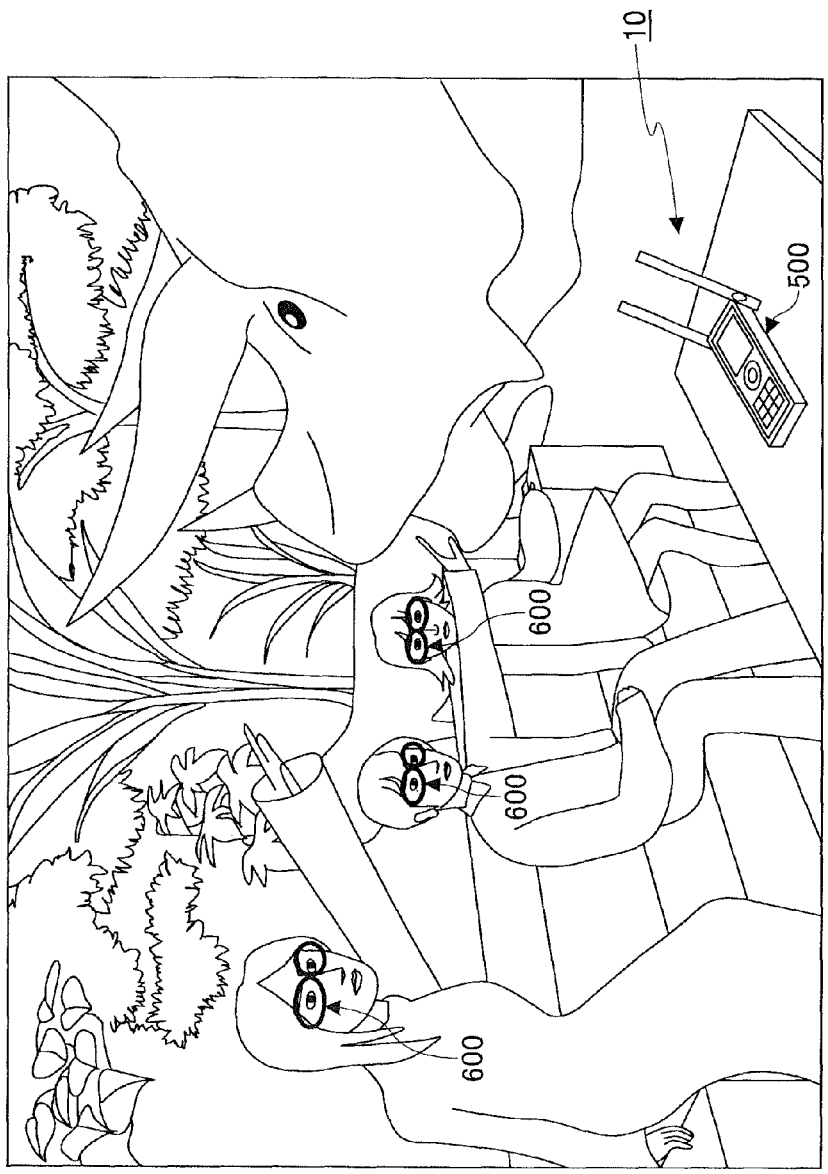
FIG. 18 is a diagram illustrating an example of an application for which the system may be used.

FIG. 18 is a diagram illustrating an example of an application for which the system 20 may be used. The system 20 may be configured to provide a user individually with an image effect and/or a sound effect according to the 3D coordinates of the user's transmitter 400, as shown in FIG. 18.

Here, it has been recognized that in various applications of augmented reality, a plurality of users need to share a system at the same time. To create more realism for such applications, it may be important to provide the users individually with image effect and sound effects according the 3D coordinates of the corresponding user's positions. A shared augmented reality may be transformed individually according the 3D coordinates of the user's positions measured by the apparatus 10, and such transformed reality is provided to each user to create a personalized augmented reality, as shown in FIG. 18. According to the implementations, since they may provide an additional capacity of detecting 3D-coordinates of the transmitter 400 with extremely small-sized hardware and a low processing workload, a plurality of users can share augmented reality with services tailored to the location of each user. It is noted that the implementations can be applied to a number of augmented reality systems other than ubicomp systems.

In the foregoing, the velocity potential response is used to measure the 3D-coordinates of the transmitter; however, a sound pressure impulse response may be used instead of the velocity potential response. In other words, similar procedures can be used for the sound pressure impulse response, because it is equivalent to the time derivative of the velocity potential response. In the case of the time derivative of the velocity potential response, the peak points may be used instead of the inflection point, because they are equivalent to the inflection points in the velocity potential response.

Further, the implementations using sound waves are described mainly; however, other waves such as radio waves may be used. The implementations may provide passive coordinate detection using the reflectors 200 which have the receivers 100 at the asymmetrical positions thereof. For example, current GPS systems require four satellites to be simultaneously available to carry out coordinate calculations. In urban area with many skyscrapers, determining locations are difficult without satellites being directly overhead. However, the implementations do not require four satellites if they are applied to the GPS measurement. The determining of locations is possible with one or two satellites. Similarly, in the case of the sonar systems, a 2-channel active sonar and 3-channel passive sonar may be able to determine 3D-coordinates.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. An apparatus configured to measure 3D coordinates of a transmitter which transmits a discontinuous wave, comprising:
   first and second substantially flat reflectors positioned a specified distance apart, each of the first and second reflectors having an elongate shape;
   a first receiver physically coupled at an asymmetrical location with respect to opposite edges of the first reflector to receive a direct wave from the transmitter and diffracted waves thereof, the diffracted waves being diffracted at the opposite edges of the first reflector;
   a second receiver physically coupled at an asymmetrical location with respect to opposite edges of the second reflector to receive a direct wave from the transmitter and diffracted waves thereof, the diffracted waves being diffracted at the opposite edges of the second reflector; and
   a processing device configured to process signals received by the first and second receivers, calculate first and second velocity potential responses or time derivatives thereof based on the respective received signals from the first and second receivers, detect inflection points or peak points in the first and second velocity potential responses or time derivatives thereof due to the respective diffracted waves received by the first and second receivers, and measure the 3D coordinates of the transmitter based on the detected inflection points or peak points.

2. An apparatus configured to measure 3D coordinates of a transmitter which transmits a discontinuous wave, comprising:
   one or more sets of a receiver and a reflector, the receiver being attached asymmetrically to the reflector and being configured to receive a direct wave from the transmitter and diffracted waves thereof, the diffracted waves being diffracted at edges of the reflector; and a processing device configured to process signals received by the one or more receivers.

3. The apparatus of claim 2, wherein the number of the sets of the receiver and the reflector is two.

4. The apparatus of claim 3, wherein the processing device is configured to calculate velocity potential responses or time derivatives thereof based on the received signals from the receivers, detect inflection points or peak points in the velocity potential responses or time derivatives thereof due to the diffracted waves received by the receivers, and measure the 3D coordinates of the transmitter based on the detected inflection points or peak points.

5. The apparatus of claim 4, wherein the diffracted waves are generated at opposite edges of the respective reflectors, and each of the receivers is located asymmetrically with respect to the opposite edges of the corresponding reflector.

6. The apparatus of claim 5, wherein the receivers are microphones with circular apertures.

7. The apparatus of claim 5, wherein each of the reflectors has a substantially rectangular shape, and each of the receivers is located asymmetrically with respect to opposite short edges of the corresponding reflector, and
the diffracted waves are generated at the opposite short edges of the respective reflectors.

8. The apparatus of claim 5, wherein each of the reflectors has a substantially rectangular shape, and each of the receivers is located asymmetrically with respect to opposite short edges of the corresponding reflector and symmetrically with respect to opposite long edges of the corresponding reflector, and
the diffracted waves are generated at the opposite short edges of the respective reflectors.

9. The apparatus of claim 2, wherein the reflector is substantially flat and has substantially rectangular shape.

10. The apparatus of claim 2, wherein the discontinuous wave is a short pulse wave.

11. The apparatus of claim 2, wherein the number of the sets of the receiver and the reflector is one, the reflector has a rectangular shape, and the receiver is provided at a location which is differently spaced from opposite edges of the reflector in both of two directions which are perpendicular to each other.

12. The apparatus of claim 11, wherein the reflector has a substantially rectangular shape, and the receiver is provided at different distances from the opposite short edges of the reflector and at different distances from the opposite long edges of the reflector.

13. The apparatus of claim 11, wherein the processing device is configured to calculate velocity potential response or time derivative thereof based on the received signal from the receiver, detect inflection points or peak points in the velocity potential response or time derivative thereof due to the respective diffracted waves received by the receiver, and measure the 3D coordinates of the transmitter based on the detected inflection points or peak points.

14. A system comprising:
the apparatus of claim 2; and
a plurality of transmitters configured to be possessed by users, each transmitter being configured to transmit a discontinuous wave in response to a demand from the apparatus.

15. The system of claim 14, wherein the system is configured to provide each user individually with an image effect and/or a sound effect according to the 3D coordinates of the transmitter of the corresponding user which are measured by the apparatus.

16. A method comprising:
receiving with one or more sets of a receiver and a reflector a discontinuous wave transmitted by a transmitter, the receiver being attached asymmetrically to the reflector and being configured to receive a direct wave from the transmitter and diffracted waves thereof, the diffracted waves being diffracted at edges of the reflector; and
processing signals received by the one or more receivers to measure 3D coordinates of the transmitter.

* * * * *

UNITED STATES PATENT AND TRADEMARK OFFICE
CERTIFICATE OF CORRECTION

| | |
|---|---|
| PATENT NO. | : 8,830,791 B2 |
| APPLICATION NO. | : 13/256670 |
| DATED | : September 9, 2014 |
| INVENTOR(S) | : Ueda |

It is certified that error appears in the above-identified patent and that said Letters Patent is hereby corrected as shown below:

In the Specification

In Column 2, Line 5, delete "ϕ(t)" and insert -- φ(t) --, therefor.

In Column 3, Line 23, delete "ϕ(t):" and insert -- φ(t): --, therefor.

In Column 4, Line 4, delete "ϕ(t)" and insert -- φ(t) --, therefor.

In Column 4, Line 12, delete "ϕ(t)" and insert -- φ(t) --, therefor.

In Column 5, Lines 31-32, delete "time T" and insert -- time τ --, therefor.

In Column 8, Line 5, delete "$L_{1R}/L_{0R}$," and insert -- $L_{1R}, L_{0R}$, --, therefor.

In Column 8, Line 7, delete "$(-h,-d_1,0)$" and insert -- $(-h,-d_1,0)$, --, therefor.

In Column 12, Line 2, delete "and or" and insert -- and/or --, therefor.

Signed and Sealed this
Thirty-first Day of March, 2015

Michelle K. Lee
*Director of the United States Patent and Trademark Office*